Jan. 14, 1930. N. L. DERBY 1,743,809
SHIM
Filed Aug. 30, 1926

INVENTOR
Norman L. Derby
BY
Hammond & Littell
ATTORNEYS

Patented Jan. 14, 1930

1,743,809

UNITED STATES PATENT OFFICE

NORMAN L. DERBY, OF LONG ISLAND CITY, NEW YORK, ASSIGNOR TO LAMINATED SHIM COMPANY, INC., OF LONG ISLAND CITY, NEW YORK, A CORPORATION OF NEW YORK

SHIM

Application filed August 30, 1926. Serial No. 132,373.

This invention relates to shims or spacing members designed for use between the parts of a bearing, to hold the bearing members in spaced relation, and to permit the bearing to be tightened when necessary by reducing the thickness of the shims.

It is an object of the present invention to provide an improved shim, especially adapted for forced feed lubrication, so constructed as to prevent the escape of oil from the bearing. To this end the shim is so constructed that a part thereof is in alignment with the bearing surfaces.

It is a further object of the invention to provide an improved means for retaining the parts of a laminated shim in superposed relation.

Another object of the invention is to provide a shim having the major or base portion thereof formed of relatively cheap metal, such as bearing metal aluminum and providing a support for the more expensive brass or copper lamination.

Another object of the invention is to provide a shim having the major or base portion of relatively cheap metal which can be formed into a support for the laminations by punching and bending the base portion from sheets of suitable metal.

The foregoing and other desirable objects are accomplished by various forms of devices embodying the invention, a representative form being illustrated in the accompanying drawing, in which.

The invention contemplates a base or lamination support 10, which, as compared with the laminations 11 may be of substantial thickness. This member comprises a part or parts which form a section of the bearing surface, and is made of a bearing metal, such as babbitt or aluminum, and may either be cast or formed from sheet stock.

Figure 1:
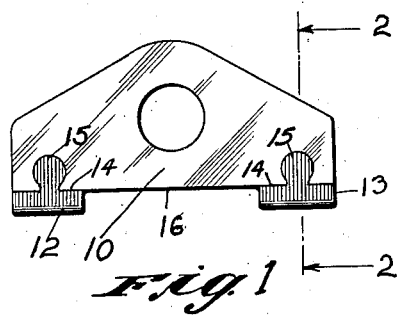
Figure 1 is a plan view of a form of shim embodying the invention.
Figure 2:
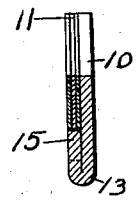
Figure 2 is a section on the line 2—2 of Figure 1.
Figure 3:
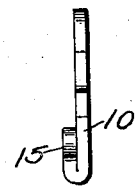
Figure 3 is an end view of the lamination supporting and holding member.

As illustrated in Figure 1, the support comprises two forwardly extending projections, 12 and 13, having faces which align with and form part of the bearing surfaces, thus closing the bearing against the escape of oil, the space between the projections forming an oil reservoir. The projections are of substantially greater thickness than the body of the support; if the support is made of sheet metal the added thickness may be secured by folding over a part of the sheet, as shown in Figures 2 and 3. Toward the back the thickened sections terminate in shoulders 14 and transversely rounded heads 15. The shoulders 14 are substantially in alignment with the forward edge 16 of the support proper.

Figure 4:
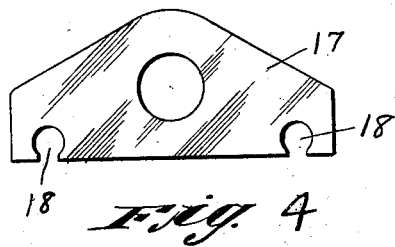
Figure 4 is a plan view of a lamination removed from the supporting member.

The base member above described is thus adapted to receive and hold a number of thin laminations 17 which may be of the configuration shown in Figure 4. The laminations conform generally to the configuration of the support, and are provided with cut-outs or notches 18 adapted to receive the heads 15.

The laminations are thus held in place without the aid of any of the usual securing means, such as solder or babbitt, distortion of the shims themselves, or bedding in a holder of soft metal; and are susceptible of ready removal when necessary.

Figure 5:
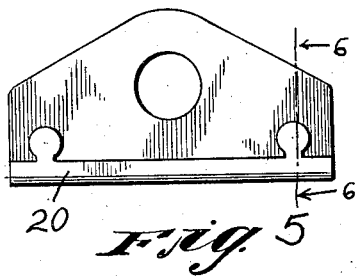
Figure 5 is a plan view of a slightly modified form of base or supporting member.
Figures 6, 7:
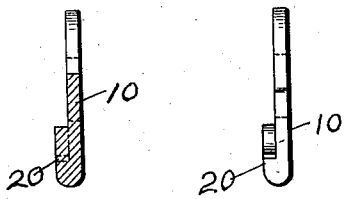
Figure 6 is a section on the line 6—6 of Figure 5.
Figure 7 is an end view of the base member shown in Figure 5.

The base or supporting member shown in Figures 5 to 7 presents a thickened bearing face 20 which is continuous throughout the length of the shim, thus completely confining the oil in the bearing. The construction is otherwise similar to that of the support already described.

It will be seen that a shim made according to this invention not only effectively closes the ends of the bearing to prevent the escape of oil, but likewise retains its laminated part in such a way that the removal of any desired number of laminations can be accomplished with a minimum of time and labor. While casting has been mentioned as a possible means of forming the base member, a preferred method contemplates stamping a blank from sheet stock and folding over one edge to form the bearing surface and furnish the lamination retaining members, representative forms of which have been illustrated in the drawing. The invention, however, is capable of embodiment in various other forms, all falling within the scope of the appended claims.

What is claimed is:

1. A shim comprising a plurality of laminations superposed on a one piece base member of bearing metal to increase the thickness thereof, said base member comprising a section extending in front of said laminations and forming a bearing surface.

2. A shim comprising a base member extending across substantially the entire bottom thereof, a plurality of laminations superposed on said base to increase the thickness thereof, an integral portion of said base projecting above the plane thereof to form a shoulder and a plurality of integral lugs, projecting above said base adjacent said shoulder to retain said laminations on said base.

3. A shim comprising a base member having laminations superposed thereon, a part of said base member projecting forward from the front edge of said laminations and forming a bearing surface, said forward part being curved over the base to increase the height to that of the laminations and to retain them on the base.

4. A shim comprising a base member and laminations superposed thereon, said base member being stamped from sheet stock, one edge thereof being folded over to form a retaining device for said laminations.

5. A shim comprising a base member and laminations superposed thereon, said base member being stamped from sheet stock and having parts thereof folded over, said folded parts being provided with projections adapted to enter grooves in said laminations for yieldingly holding said laminations in place.

6. A shim for bearings comprising superposed sections of dissimilar materials, one of said materials being a bearing material, said bearing material being arranged to space the second material from the bearing surface, by being a base recurved on itself for a portion the height of which is the same as that of the laminations.

In testimony whereof I have affixed my signature to this specification.

NORMAN L. DERBY.